Oct. 10, 1967  E. M. RICHISON ET AL  3,346,062
POWER-OPERATED WHEELCHAIR
Filed Feb. 4, 1966  7 Sheets-Sheet 1

INVENTORS
EUGENE M. RICHISON,
ETHEL M. RICHISON,
BY
Berman, Davidson & Berman
ATTORNEYS.

Oct. 10, 1967  E. M. RICHISON ET AL  3,346,062
POWER-OPERATED WHEELCHAIR
Filed Feb. 4, 1966  7 Sheets-Sheet 2

FIG. 2.

INVENTORS
EUGENE M. RICHISON,
ETHEL M. RICHISON,
BY

*Berman, Davidson & Berman*
ATTORNEYS.

Oct. 10, 1967    E. M. RICHISON ET AL    3,346,062
POWER-OPERATED WHEELCHAIR
Filed Feb. 4, 1966    7 Sheets-Sheet 7

INVENTORS
EUGENE M. RICHISON,
ETHEL M. RICHISON,
BY
Berman, Davidson & Berman
ATTORNEYS.

United States Patent Office 3,346,062
Patented Oct. 10, 1967

3,346,062
POWER-OPERATED WHEELCHAIR
Eugene M. Richison and Ethel M. Richison, Kinta, Okla., assignors to H. T. Conklin, Stigler, Okla.
Filed Feb. 4, 1966, Ser. No. 525,164
9 Claims. (Cl. 180—6.7)

ABSTRACT OF THE DISCLOSURE

A power-operated wheelchair having selectively operated wheels and tracks, the tracks being in two sections connected so that one pivots relative to the other; a pair of climbing wheels mounted adjacent the end of one section of said tracks; a common drive for said tracks and climbing wheels; manually operable means for pivoting one set of tracks relative to the other and manually operable means to place either said tracks or said wheels into locomotive position.

---

This invention relates to power-driven vehicless and, more specifically, the instant invention pertains to an automotive or self-propelled single-occupant vehicle especially designed for non-ambulatory persons. The vehicle according to this invention may be generally classified as being directed to the provision of a self-propelled wheelchair together with occupant-controlled steering means, and means enabling the vehicle to safely move up and down stairs, curbs, or other obstacles encountered by ambulatory persons engaged in normal pedestrain activities.

Power-driven wheelchairs and similar conveyances are not, per se, new in the art and, additionally, it is known that efforts have been made heretofore to develop wheelchairs with stair-climbing capabilities and to construct such vehicles in a manner so that the same may be collapsed, and wherein means have been provided to effect the leveling of the occupant's seat as the normal horizontal longitudinal axis of the vehicle chassis becomes angularly-inclined relative to a horizontal plane. These contemporary vehicles have failed, for the most part, to obtain wide-spread public acceptance due to the complexity of construction which necessarily entails high production costs and retail prices, are bulky in size thereby rendering the same impractical for transportation from site-to-site in conventional motor vehicles (automobiles, for example), occupy much floor space when in use and much needless volume in storage, and which are difficult to handle by third parties when it is necessary to move the unoccupied vehicle from room-to-room. Again, and a most important defect or disadvantage of stair-climbing vehicles of modern construction is the lack of occupant control of the vehicle when ascending or descending stairs, the lack of control resulting from power failure whereby the wheelchair, under the force of gravity, will run wild.

These disadvantages and others well-known to persons skilled in this art are obviated in the practice of this invention wherein one of the primary objects thereof is to provide a power-operated vehicle with drive means which lock immediately upon power failure to hold the vehicle stationary regardless of the angle of its normally horizontal axis relative to a horizontal plane.

Another object of this invention is to provide a self-propelled wheelchair or other similar vehicle with a single power source together with means for selectively-connecting the power source to drive means for moving the vehicle over the normally-encountered planar surfaces, horizontal or inclined, and with a second drive means operable to lift the vehicle up stairways, curbs and other similar and related obstacles and in such a manner as to enable the vehicle to descend the same.

A further object of this invention is to provide an automotive vehicle which incorporates the above-noted objects while, at the same time, is compact in normal usage, may be collapsed for storage or transportation, and which may be moved by third parties, manually, from room-to-room when the vehicle is unoccupied.

A still further object of this invention is to provide a power-driven wheelchair which incorporates a plurality of units including a primary unit to which is connected a second or forward unit, the connection between the units being such as to permit the free pivotal movement of the units relative to one another about a horizontal transverse axis; and with operator controls for the power source which offer him complete control as the vehicle descends or ascends an incline, thereby enhancing the confidence of the operator while, at the same time, insuring him a high degree of safety in the operation of the conveyance.

Still another object of this invention is to provide a vehicle in accordance with the preceding objects which includes an improved steering means to effect a short-turning radius, and driving or power means which require no independent braking system when it is desired to halt the movement of the vehicle. Such means provide the operator with positive control with the optimum of maneuverability and with every assurance of safe control of the vehicle even in the event of emergencies.

It is an additional object of this invention to provide a power-operated conveyance of the wheelchair type together with means operable to shift the position of the seat platform of the occupant's seat whereby the occupant is afforded better visibility when traveling on inclines, and to facilitate the occupant's entering or leaving the vehicle, or for performing various occupations while seated in the chair of the conveyance.

While the above-noted objects are prime and are not necessarily set forth in the order of their importance, among these and other objects not specifically mentioned is the object of providing a self-powered vehicle of the type generally described supra, which enables elderly persons, invalids, and semi-invalids of various ages who are handicapped by the loss of mobility to utilize their several unimpaired facilities and capabilities to the full enjoyment thereof and which would be otherwise unused and unfulfilled. The restoration of mobility to such handicapped persons not only contributes to their sense of well-being and physical comfort, but also enables those so afflicted with means for entering gainful employment to the economic advantage of all concerned.

This invention contemplates, as a still further object thereof, the provision of a power-driven wheelchair which is noncomplex in construction and assembly, inexpensive to manufacture, and which is rugged and durable for its intended use.

Other and further residual objects and advantages of this invention will become subsequently more manifest from a consideration of the annexed drawings when read in conjunction with the appended specification, and in which:

FIGURE 2 is a side elevational view of the power-operated wheelchair;

FIGURE 8 is an enlarged fragmentary detail cross-sectional view showing the consrtuction of one of the adjustable V-belt pulleys; and FIGURE 9 is a fragmentary side elevational view of the power-operated wheelchair showing the seat thereof as moving toward its collapsed position.

Figure 1:
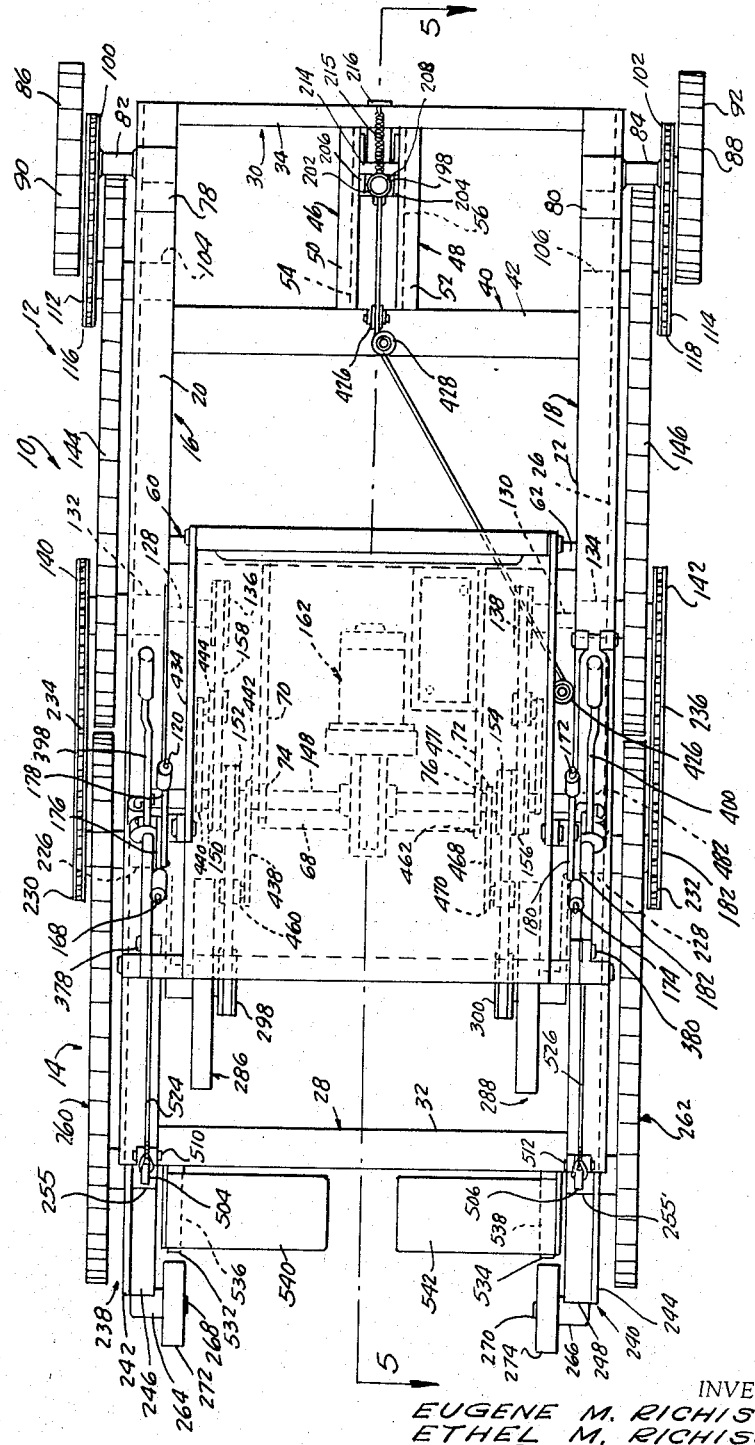
FIGURE 1 is a top plan view of a power-operated wheelchair constructed according to this invention.

Referring now more specifically to the drawings, reference numeral 10 designates a power-operated wheelchair or similar conveyance constructed in accordance with the teachings of this invention. For convenience in understanding the present invention, the wheelchair 10 may be considered as comprising a main unit 12 and a front or leading unit 14, when taken together, form the composite whole of the mechanism.

Figure 4:
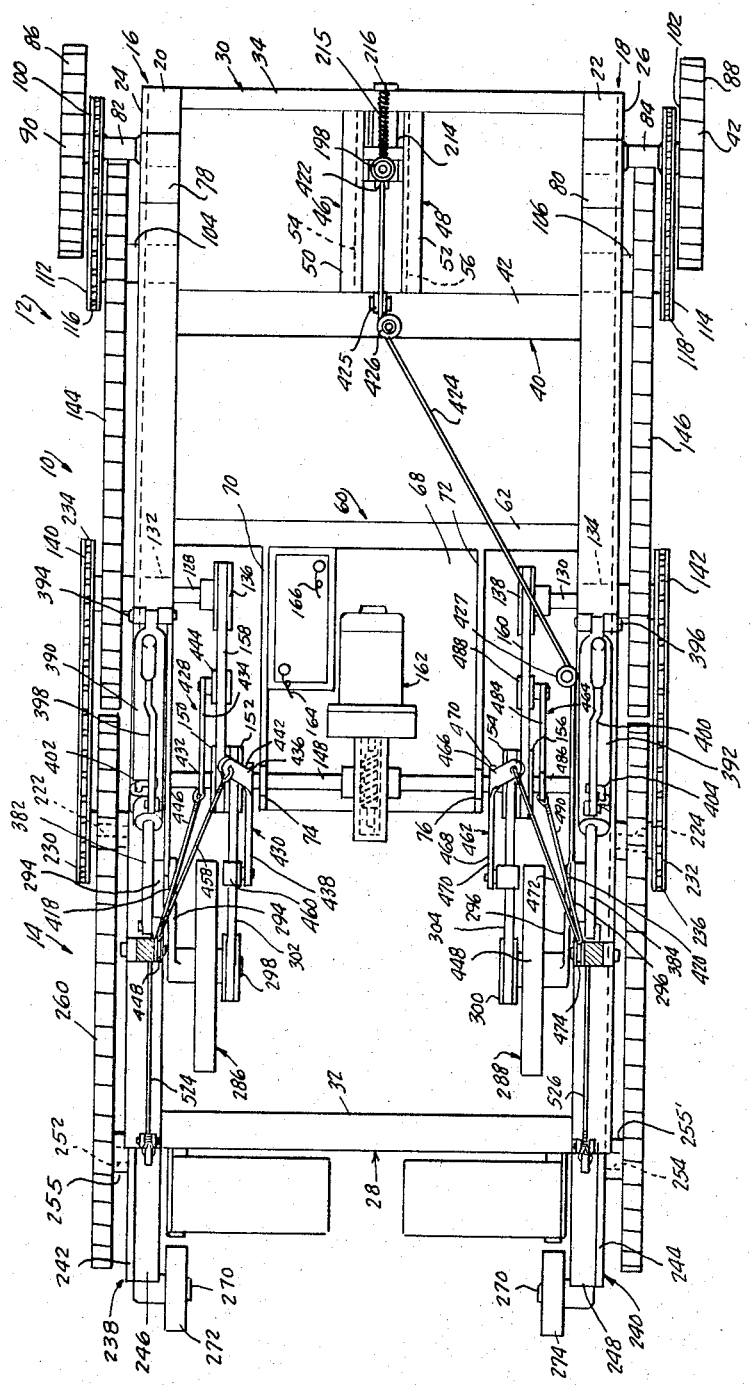
FIGURE 4 is a top plan view similar to FIGURE 1, but with the occupant's adjustable seat removed, FIGURE 4 being taken substantially on the horizontal plane of line 4—4 of FIGURE 2, looking in the direction of the arrows.

The main unit 12 comprises an open rectangular box-type frame or chassis which includes a pair of elongated, laterally-spaced and substantially parallel L-shaped side frame members 16, 18, the side frame members opening inwardly toward one another and each includes horizontal feet 20, 22 and depending side legs 24, 26, respectively. The opposed adjacent pairs of ends of the side frame members are rigidly-connected together by transversely-extending substantially parallel front and rear end frame members 28, 30 also L-shaped and inverted, these frame members having normally horizontal feet 32, 34 and depending legs 36, 38, respectively. The chassis or frame may include one or more reinforcing L-shaped cross-frame members 40 extending between the side frame members 16, 18 and having opposed ends rigidly-secured thereto, all in the conventional manner. The cross-frame member 40, in this particular instance, has an additional function aside and apart from its bracing use and is, hence, further and more specifically described as extending parallel to the end frame members 28, 30 adjacent to, but spaced inwardly from the latter and having a normally horizontal foot 42 and an upright depending leg 44. As is seen in FIGURE 4, a pair of laterally-spaced and substantially parallel inverted longitudinally-extending laterally-spaced L-shaped and downwardly-opening mounting members 46, 48 extend between the rear end frame member 30 and the cross-frame member 40 and have their opposed ends rigidly-secured thereto centrally of the ends thereof.

The mounting members 46, 48 are provided with normally horizontal feet 50, 52 and depending upright adjacent and confronting legs 54, 56, respectively, and extend substantially parallel to the side frame members 16, 18.

Reference numeral 60 indicates a transversely-extending inverted modified cross-frame member having its opposed ends rigidly-connected to the side frame members 16, 18, the cross-frame member 60 being parallel to and spaced inwardly of the cross-frame member 40 relative to the side frame members 16, 18. The cross-frame member 60 is provided with the usual normally horizontal foot 62 and depending upright leg 64 having a central depending extension or lip 66 intermediate its ends, the extension or lip 66 (see FIGURES 4 and 5) having a forwardly-extending normally horizontal substantially rectangular platform 68 integrally-formed with the lower marginal edge thereof. The longitudinally-extending opposed sides of the platform 68 at the marginal edges thereof are rigidly-connected to the lower ends of a pair of upright longitudinally-extending substantially rectangular and parallel sidewalls 70, 72, and each of the sidewalls 70, 72 adjacent the forward or front free ends thereof is integrally-connected with an upright centrally-apertured boss 74, 76, respectively.

Fixedly-secured to the feet 20, 22 adjacent the rear ends thereof are a pair of fixedly-connected upwardly-projecting journals 78, 80, respectively, in which are journaled one of the ends of a pair of co-axially-aligned shafts 82, 84, respectively, the other ends of the latter projecting laterally away from their associated side frame members 16, 18. Mounted on and fixedly-secured to each of the shafts 82, 84 is a wheel 86, 88, respectively, each of which is formed with a plurality of circumferentially-spaced radially-extending lugs 90, 92 adapted for engagement on a normally horizontal tread 94 (see FIGURES 6 and 7) of a curb or stairway 96 having one or more risers 98, the lugs 90, 92 serving a function to be described. Also fixedly-secured on the shafts 82, 84 for rotation therewith is a sprocket wheel 100, 102, respectively, positioned immediately adjacent their associated wheel 86, 88.

The side frame members 16, 18, adjacent their respective rear ends have their respective legs 24, 26 provided with bosses 104, 106, respectively, which confront one another from the proximate sides thereof and all are cylindrically-bored to journal one of the ends of the shafts 108, 110, respectively. Keyed or otherwise secured to the outer ends of each of the shafts 108, 110 are sprocket wheels 112, 114, respectively, these sprocket wheels being aligned with the sprocket wheels 100, 102 and trained about the aligned sprocket wheels 100, 112 and 102, 114 is an endless sprocket chain 116, 118, respectively. Also mounted on the shafts 108, 110 and fixedly-secured thereto and spaced inwardly therefrom are, respectively, variable diameter V-belt pulleys 120, 122 to which further reference will be made.

Similar variable diameter pulleys 124, 126 are disposed on the remotely-disposed sides of the side frame members 16, 18, these pulleys being fixedly-connected to the remotely-disposed ends of a pair of coaxially-aligned shafts 128, 130 journaled for rotation in bosses 132, 134, as before, the bosses projecting laterally from the depending legs 24, 26. To the proximate ends of each of the shafts 128, 130 and fixedly-connected thereto are V-belt pulleys 136, 138, respectively, to which reference will be further made infra, and to the remotely-disposed ends of the shafts 128, 130 are fixedly-secured sprocket wheels 140, 142, the function of which will be recited below. Endless traction belts 144, 146 are trained about the pairs of wheels 120, 124 and 122, 126, the wheels of each pair being aligned with one another.

Reference numeral 148 designates a drive shaft (see FIGURES 4 and 5) extending transversely across the main unit 12 intermediate the ends thereof, the drive shaft 148 being journaled for rotation in the bosses 74, 76 intermediate its ends. Fixedly-secured on one end of the drive shaft 140 are a first pair of V-belt drive pulleys 150, 152 disposed in side-by-side relation relative to one another, and a second pair of identical V-belt pulleys 154, 156 are similarly mounted on the other end of the shaft 148. The pulleys 136 and 150 are aligned with one another and have an endless V-belt 158 trained thereabout placing the pulley 136 in driven relation relative to the pulley 150. An endless V-belt 160 is trained about the pulleys 138, 156 which are also aligned, the V-belt 160 placing the pulley 138 in driven relation relative to the pulley 156.

Reference numeral 162 denotes a conventional electric motor mechanically-connected by suitable means to the platform 68. The motor 162 is electrically-connected by wires 164, 166 with the motor 162 through a conventional wiring circuit (not shown), the circuit including normally open push-button switches 168, 170, 172, 174, mounted on the outer ends of handle levers 176, 178, 180 and 182, respectively, and to the latter more detailed reference will be made below. The electric circuit includes the switches 168, 170, 172, 174 which are wired in parallel whereby the closing of any one of these switches will energize the motor 162.

The motor 162 includes a drive shaft 176 (see FIGURE 5) on which is fixedly-secured a first spur gear 178 that meshes with the second spur gear 180, the spur gears being disposed in a gear box 182. One end of a power take-off shaft 184 is disposed in a housing 186 and has a worm gear 188 integral with or fixedly-secured to its other or outer end. The worm gear 188 is, in turn, meshed with the spur gear 190 secured on the drive shaft 148 intermediate its ends and disposed within the housing 186.

Reference numeral 192 denotes a normally upright hollow cylindrical sleeve (see FIGURE 5) disposed adjacent the rear end of the main unit 12, the sleeve being pivotally-mounted on outwardly-extending, diametrically-opposed pins 194 (only one being shown), having their outer ends journaled in the feet 54, 56 of the mounting members 46, 48, the sleeve 192 being swingable through an arc paralleling the longitudinal axis of the unit 12. The sleeve 192 journals one end of an elongated shaft 196 for rotation therein, the opposed ends of the shaft 196 extending beyond the adjacent upper and lower ends of the sleeve 192. Superimposed on the upper end of the sleeve 192 and journaling the adjacent end of the shaft 196 for rotation therein is a cap 198 secured in position by a collar 200 superimposed thereon and fixedly-connected to the shaft 196. The lower end of the sleeve 192 abuts the diametrically-extending bight 202 of an inverted U-shaped bracket 204 having depending arms 206, 208 at each end thereof, respectively. The lower ends of the arms 206, 208 support the opposed ends of a cross-shaft 210 therebetween, and carried on the cross-shaft 210 is a caster wheel 212. Extending-transversely between the legs 54, 56 and behind and in tangential-engagement with the sleeve 192 is an L-shaped stop bar 214 which limits the clockwise swinging movement of the sleeve 192 and consequently of the wheel 212. The sleeve 192 is constantly biased for swinging movement in a counterclockwise direction by means of a helicoidal spring 215 having an end connected with the collar 198 and its other end suitably-anchored as at 216 (see FIGURE 1) to the back frame member 30.

The main unit 12 also includes a pair of oppositely-disposed forwardly-located laterally-spaced adjustable-diameter V-belt pulley wheels 218, 220 identically constructed with respect to the other pairs of pulley wheels 120, 122 and 124, 126, the wheels being mounted on shafts 222, 224, respectively, and the latter are supported in bosses 226, 228 of the type described. Fixedly-secured on the shafts 222, 224 and the remotely-disposed sides of the wheels 218, 220 are sprocket wheels 230, 232, respectively. The sprocket wheels 230, 232 are aligned with the sprocket wheels 140, 142, respectively, and the pairs of aligned sprockets have sprocket chains 234, 236 trained therearound. Thus, as the shafts 128, 130 are driven, power will be transmitted to the pulley wheels 218, 220.

The front or forward unit 14 comprises a pair of elongated L-shaped side frame members 238, 240 having upright legs 242, 244 juxtaposed, respectively, with respect to the legs 24, 26, and the lower ends of the legs 242, 244 terminate in inwardly-extending parallel and confronting feet 246, 248. The inner ends of the legs 242, 244 are integral with laterally-projecting hollow bosses 250 (only one being shown in FIGURE 7), and in which the shafts 222, 224 are received. The shafts 222, 224 thus become the centers for the pivotal movement of the side frame members 238, 240.

Shafts 252, 254 are journaled in bosses 255, 255' which project laterally from the legs 242, 244 adjacent the free ends thereof and have secured thereon, adjacent their remotely-disposed sides, the adjustable-diameter pulley wheels 256, 258. These pulley wheels are identical to and are aligned with the pulley wheels 218, 220, respectively, and the aligned pairs of pulley wheels have endless traction V-belts 260, 262 trained thereabout. Thus, as the shafts 128, 130 are rotated, power will be transmitted to the wheels 256, 258. To serve a purpose to be described, the outer ends of each frame member 238, 240 has a boss 264, 266, respectively, fixedly-secured thereon which mount one of the ends of a pair of shafts 268, 270 having horizontal coincident axes, the other ends of the shafts having trundle wheels 272, 274 mounted thereon.

Figure 7:
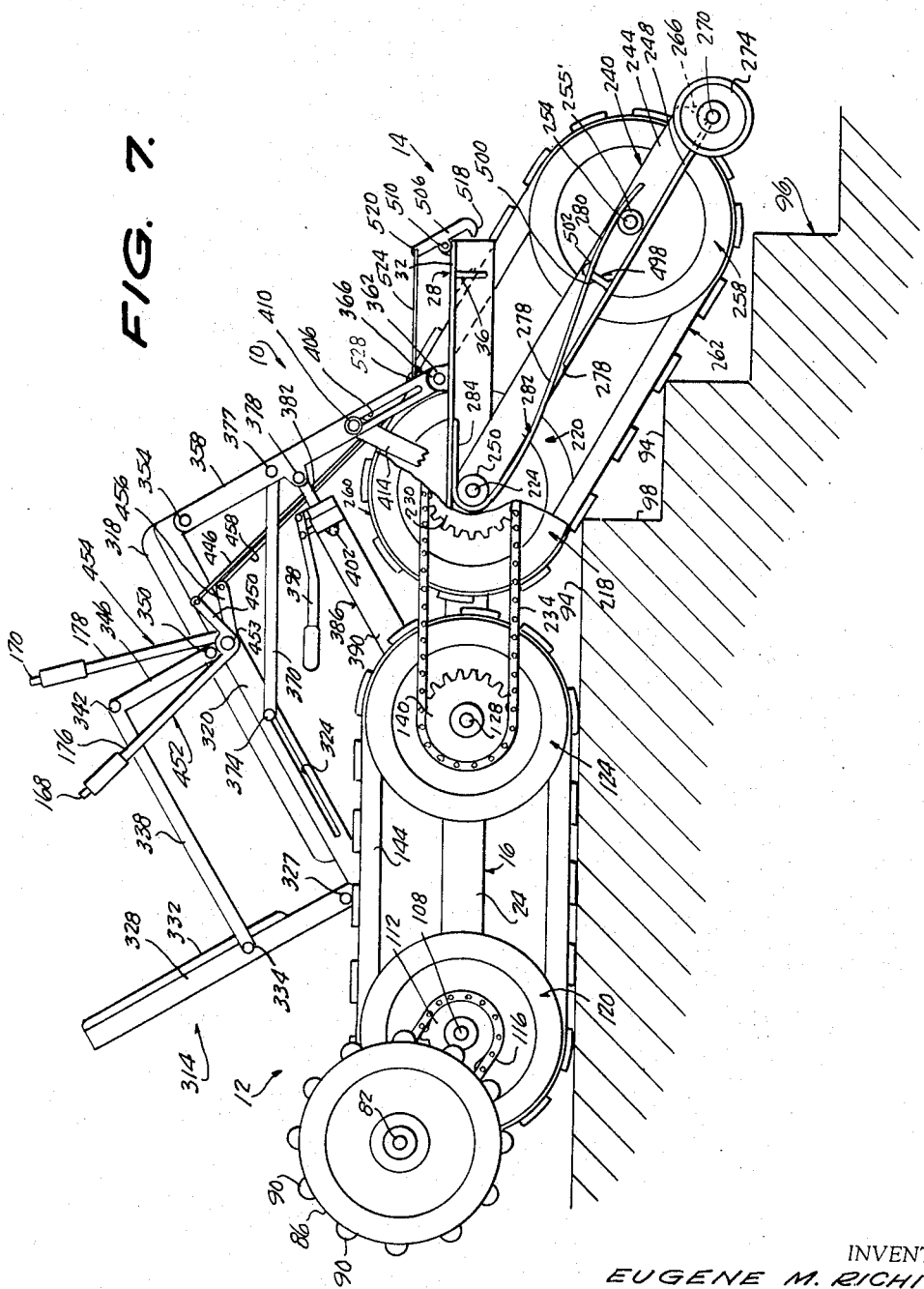
FIGURE 7 is a side elevational view of the wheelchair and showing the pivotal relationship between the main power unit and its front or leading unit as the conveyance starts its descent of a stairway or approaches the end of the ascent thereof.

As is clearly seen in FIGURE 7, the inner end of the foot 248 is cut away to form an elongated slot 276 which receives therein the central portion 278 of an arm 280 forming a part of a leaf spring 282 having its other arm 284 reverted about the boss 250 to bear against the underside of the foot 32. The outer terminus of the arm 280 extends over the boss 255'. This construction is duplicated on the other side of the vehicle 10 and it is seen that the same constantly biases the side frame members 238, 240 for pivotal movement about the shafts 222, 224 in a clockwise direction, reference being made to FIGURE 7.

Reference numerals 286, 288 designate a pair of identical forwardly-disposed ground-engaging wheels of identical construction, the wheels 286, 288, taken together with the caster wheel 212, comprise the normal locomotive means for the conveyance 10. The wheels are each mounted on one end of a shaft 290, 292, respectively, the other ends of the shafts projecting laterally from the lower ends of a pair of elongated levers 294, 196. The shafts also have fixedly-mounted thereon V-belt pulleys 298, 300 which are aligned with the pulleys 152, 154, respectively, and the pairs of aligned pulleys have endless V-belts 302 and 304 trained thereabout.

The levers 294, 196 are pivotally-mounted intermediate their ends on stub axles 306, 308 journaled in bosses 310, 312 secured, respectively, to feet 20, 22. The wheels 286, 288 are vertically-adjustable relative to the side frame members 16, 18 through kinematic means associated with the conveyance's seat construction which become operable as the seat is moved from an erect or upright position to a tilted position.

Referring now more specifically to the details of the seat construction, the seat being herein designated by reference numeral 314, the same is seen to comprise a normally horizontal substantially rectangular cushion-support plate 316 (see FIGURE 3) for a cushion or pad 318, the plate 316 having downwardly-depending side flanges 320, 322 each of which, respectively, has an elongated longitudinally-extending slot 324, 326 formed therein. To the rear end of each flange 320, 322 is pivotally-connected, as at 327, 327', the lower ends of a pair of laterally-spaced seat back-support members 328, 330. Extending between and fixedly-secured to the upper ends of the back-support members 328, 330 is a substantially rectangular backrest 332. Pivotally-connected at 334, 336 are one of the ends of a pair of laterally-spaced substantially parallel elongated arm-rest members 338, 340, and the other ends of the latter are pivotally-connected at 342, 344 to the upper ends of normally upright standards 346, 348, and the lower ends of the standards 346, 348 are pivotally-connected at 350, 352 adjacent to, but spaced from the forward ends of the flanges 320, 322. The forward ends of the flanges 320, 322 are pivotally-connected at 354, 356 to the upper ends of a pair of elongated substantially rectangular braces 358, 360. The lower ends of the braces are pivotally-connected on pivot pins 362, 364 secured in bosses 366, 368 projecting upwardly from the feet 20, 22. Reference numerals 370, 372 designate a pair of corner struts, the struts having their respective upper ends connected to the slide pins 374, 376 which are, in turn, connected to the flanges 320, 322 for longitudinal sliding movement in their respective slots 324, 326. The other or lower ends of the struts 370, 372 are pivotally-connected to the side braces 358, 360 as at 374, 376. Pivot pins 378, 380 connect the outer ends of piston rods 382, 384 with the braces 358, 360 intermediate the ends of the latter, and the other ends of the piston rods 382, 384 are reciprocable through one end of hydraulic (or pneumatic) self-contained jacks 386, 388 of conventional construction and including casings 390, 392. The lower ends of the casings 390, 392 are pivotally-connected at 394, 396 to the feet 20, 22. The jacks 386, 388 are hand-actuated by levers 398, 400 and pressure-release means for the jacks 386, 388 are provided and are controlled by valve-actuator means 402, 404.

The lower ends of the braces 358, 360 are longitudinally-slotted as at 406, 408 and slidably-receive therein pins 410, 412, respectively, to which one of the ends of a pair of links 414, 416 are connected. The other ends of the links 414, 416 are pivotally-connected at 418, 420 to the other, or upper ends of the levers 294, 296.

As is seen in the drawings, the cap 198 is provided with a bracket 422 in which is secured one end of an elongated cable 424, the other end of the cable 424 being threaded between guide pulleys 425, 426 mounted on the foot 42 for rotation about, respectively, horizontal and vertical axes. The other end of the cable 424 is extended to pass around a third pulley 427 and its terminal end is secured by conventional means to the pivotal connection 420. The pulley 427 is here shown as being supported for rotation on the foot 22, but the pulley could be, if desired, mounted on the foot 20 and the aforesaid other end of the cable 422 connected to the pivotal connecting means 418. It is thus seen that as the seat 314 is pivoted downwardly, the links 414, 416 will push against the levers 294, 296 causing them to turn in a clockwise direction, reference being made to FIGURE 2, the chair 314 moving toward a tilted position as shown in FIGURE 7. The wheels 286, 288 will be thus elevated and the caster wheel 212 will turn in such a direction as to elevate the same in a counterclockwise direction, the elevational movement, in each case, being referred to the normally horizontal side frame members 16, 18.

Reference numerals 428, 430 denote bell-crank levers having, respectively, arms 432, 434 and 436, 438. The arms 432, 434 have a common end 440 (see FIGURE 1) journaled for rotation on the cross-shaft 148, and the arms 436, 438 have a common end 442 similarly mounted. The other end of the arm 434 has a belt-tensioning roller 444 rotatably-journaled thereon for selective engagement with the belt 158; and the other end of the arm 432 is connected to one end of a cable 446, the other end of the cable 446 passing under a pulley 448 for connection to an arm 450 of a bell-crank lever 452 of which the handle lever 176 comprises the other arm. As is seen in FIGURE 7, the common ends of the arms 450, 176 are pivotally-mounted on a shaft 453 projecting laterally from the flange 320.

A second bell-crank lever 454, including the handle lever 178 as one arm and the arm 456 as its other arm, is similarly pivotally-supported on the shaft 453, and the outer end of the arm 456 is connected to one end of a cable 458, the other end of the cable being trained around the same pulley 448 and connected with the other end of the arm 436. The other end of the arm 438 has a belt-tension roller 460 rotatably-mounted thereon for engagement over the belt 302. From FIGURES 4 and 7 it is seen that the pivotal movement of the lever 178 in a counterclockwise direction (reference being made to FIGURE 7) causes the bell-crank lever 430 to turn in a clockwise direction to tightly-engage the roller 460 against the belt 302.

The other end of the cross-shaft 148 supports a similar pair of bell-crank levers 462, 464 disposed in axially-spaced relation and for free rotation thereon. As is seen in the drawings, the bell-crank lever 462 includes the arms 466, 468 having their common ends 470 journaled on the cross-shaft 148 and the outer end of the arm 468 carries a rotatably-mounted belt-tension roller 470 for engagement over the belt 304; and the other end of the arm 466 has one end of a cable 472 connected thereon, the other end of the cable 472 being threaded under a pulley 474 mounted on the pin 448 and connected to one end of an arm 480 of a bell-crank lever 482 which includes the handle lever 180 as its other arm. Thus, as the bell-crank lever 482 is pivoted in a clockwise direction, reference being made to FIGURE 6 of the drawings, the roller 470 will engage against the upper side of the belt 304.

The bell-crank lever 464 includes the arms 484, 486, and to the outer end of the arm 484 and projecting laterally therefrom is connected a belt-tensioning roller 488 for selective engagement against the underside of the belt 160. The free end of the arm 486 is connected to one end of a cable 490, and the other end of the cable 490 passes under the pulley 474 and is secured to one end of an arm 492 of a bell-crank lever 494 having the lever 182, as the other arm thereof. Both bell-crank levers 482 and 494 are mounted for pivotal movement about a shaft 453' projecting laterally from the flange 322.

The side frame members 238, 240 of the front unit 14 are each provided with latching means for holding the front free ends thereof in substantially parallel relation relative to the side frame members 16, 18. The latching means comprise (reference being made to FIGURES 3 and 5) inverted, forwardly-facing and downwardly-opening hooks 496, 498 of which only the hook 498 is shown in detail in FIGURES 5 and 7. With the understanding that the same latching means is repeated from one side frame member to the other side frame member, and referring specifically to the hook 498, it is seen that the hook 498 includes an elongated normally upright leg 500 having the lower end thereof fixedly-secured to the foot 248 intermediate the ends thereof. The upper end of the leg 500 terminates in a forwardly-facing foot 502. Cooperating with the latching means 496, 498 are a pair of pawls 504, 506, the latter being pivotally-mounted at 510, 512 to the forward terminal ends of the feet 20, 22, respectively. From FIGURES 5 and 7 it is seen that the pawls 506, 508 are spring-biased by means of the leaf springs 514 (only one being shown) for movement about their respective pivotal connections 510, 512, in a clockwise direction and that the pivotal connections therefor are made intermediate their respective ends. The neb ends 516, 518 open inwardly toward the immediately adjacent one of the feet 502 and are engageable thereunder to hold the side frame members 238, 240 in their raised or elevated positions. The other ends of the pawls 506, 508 are pivotally-connected at 520, 522 to one of the ends of a pair of substantially rigid links 524, 526, respectively, and the other ends of the latter are pivotally-connected at 528, 530 to the lower ends of the braces 358, 360, respectively. The arrangement and function of the links 524, 526 is such that as the seat 314 of the conveyance 10 is tilted rearwardly as shown in FIGURE 7, the pawls 506, 508 will pivot in a counterclockwise direction to release their respective nebs 516, 518 from below the feet 502 to release the side frame members 238, 240 for downward movement.

Projecting forwardly from the foot 36 of the end or cross-frame member 28 and adjacent each end thereof are a pair of elongated substantially cylindrical shafts 532, 534 which rotatably-support an elongated sleeve 536, 538, respectively, and each of the sleeves 536, 538 is integral with and is rigidly-secured to one side of a pair of inwardly-extending laterally-spaced and confronting parallel foot rests 540, 542, respectively. The foot rests 540, 542 are substantially rectangular in configuration, and in their operative position (see FIGURE 1) are pivoted downwardly to assume a substantially common horizontal plane, this position being maintained by means of a pair of segment-shaped flanges 546, 548 having one of their respective sides fixedly and integrally-connected with the foot rests 540, 542, and their respective second sides 550, 552, respectively, are disposed in abutting relationship with the inturned ends 554 (see FIG- URE 8) of L-shaped stop members 556 having their respective legs 558 fixedly-secured to the foot 32. It will be understood that when the foot rests 540, 542 are not required they will be moved from their full-line positions of FIGURE 1 to their upstanding inoperative positions as shown in dotted lines in FIGURE 8.

While the above description of the several bosses utilized in supporting the shafts on which are mounted the variable diameter pulley wheels has been generalized one preferred form for supporting such shafts is seen in FIGURE 8. This figure was taken substantially on the vertical plane of line 8—8 of FIGURE 2 and as such, includes a showing of the shaft 254 and the variable diameter pulley wheel 258. As illustrated in this figure, the pulley wheel 258 is seen to comprise an elongated substantially hollow cylindrical hub 600 having the pulley wheel 258 mounted on one end thereof. The pulley wheel 258 includes a back plate 602 having a frusto-conical configuration including a sidewall 604 and an end wall 606 disposed substantially at the plane of the frustum. The end wall 606 is provided with a central aperture 608 through which the hub 600 extends and to which the end wall 606 is secured. The front plate 610 also has a frusto-conical configuration and includes the sidewall 612 and an end wall 614 at the plane of the frustum thereof. The end wall 614 is centrally-apertured as at 616 to receive the outer end of the hub 600 therethrough. The outer end of the hub 600 is threaded as at 616 and receives thereon the nut 618 which bears against a lock washer 620, and the latter bears against a hub 622 integral with the end wall 614 and projecting laterally away therefrom. A washer 624 is mounted on the shaft 254 and bears against the outer end of the hub 600, and this washer 624 is held against displacement by means of the diametrically-extending cotter pin 626 carried by the outer end of the shaft 254.

The inner end of the shaft 254 extends transversely through the leg 244 which is integrally-formed with the boss 255' through which the inner end of the shaft 254 also extends. In this instance, the shaft 254, at its inner end, is headed as at 628 to prevent lateral displacement of the shaft 254 to the right as viewed in FIGURE 8, the cotter pin 626 preventing displacement of the shaft 254 to the left as viewed in this figure. The space between the bosses 255, 255' and the adjacent sides of the feet 248 are metal fitted as at M to lend strength to the bosses.

From the foregoing description it is easily seen that as the nut 618 is tightened on the hub 600 the distance between the back and front plates 602, 610 lessens, thereby increasing the effective diameter of the pulley wheel 254, and the reverse is true when the nut 618 is turned in the opposite direction.

The variable diameter pulley wheels so constructed and mounted afford the user with a simple and direct means for making any necessary adjustments in the endless belts which are trained about each adjacent aligned pair thereof.

From the foregoing description of the construction of this conveyance, the operation thereof is deemed to be self-evident. However, for the purpose of clarity, a brief summation thereof is offered, infra.

Figure 3:
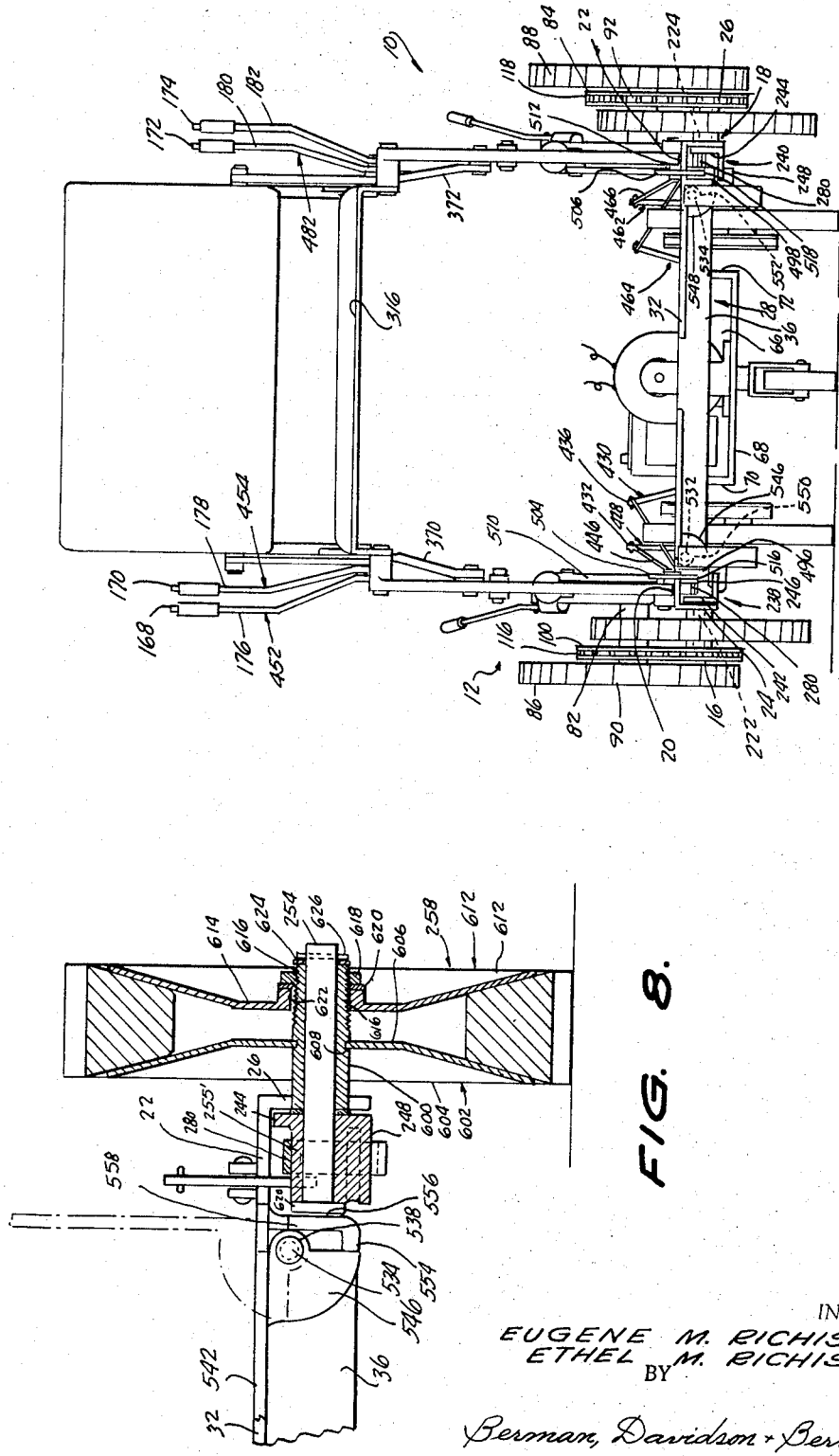
FIGURE 3 is a front end elevational view thereof.
Figure 5:
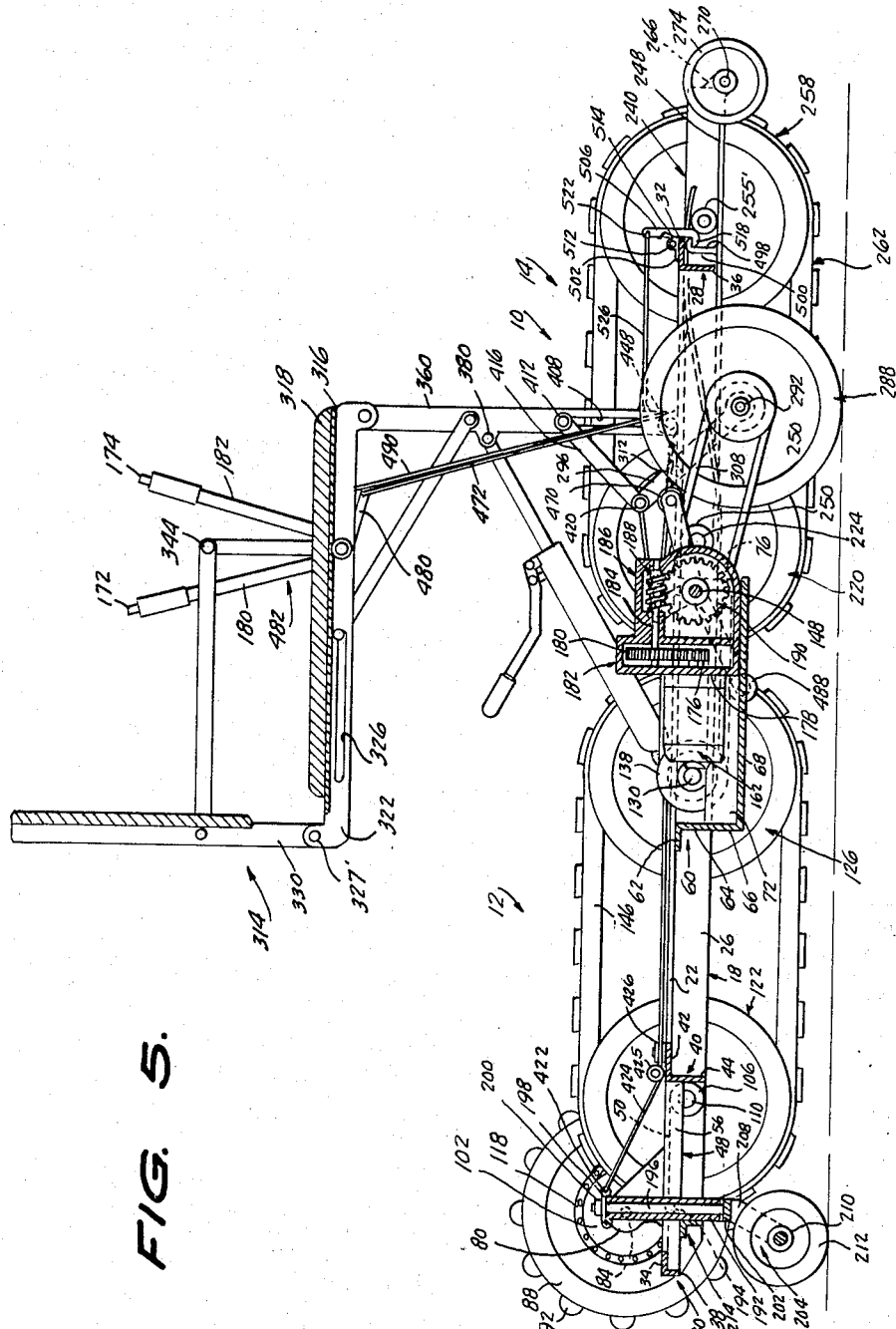
FIGURE 5 is a longitudinal detail cross-sectional view, FIGURE 5 being taken substantially on the horizontal plane of line 5—5 of FIGURE 1, looking in the direction of the arrows.

Assuming that the conveyance is in its operative positions as shown in FIGURES 2, 3 and 5, and with the foot rests or platforms 540, 542 raised to their dotted-line positions shown in FIGURE 8, the user of the conveyance 10 will preferably move to a position between the side frame members 238, 240 and will be seated on the cushion or pad 318 which extends across the support plate 316. The foot rests 540, 542 are then pivoted downwardly to their full-line positions shown in FIGURES 1, 4 and 8, and assuming that the seat occupant wishes to move forwardly, the operator will close an electrical reversing switch (not shown) so that the motor 162 is energized by the closing of any one of the switches 168, 170, 172, 174, to cause the drive shaft 148 to turn in a clockwise direction, reference being made to FIGURE 5, whereby the drive pulleys 152, 154 will drive in the same direction. Thus, when the occupant is ready to move forwardly, he grasps the handle levers 176 and 180 and closes either one or both of the switch buttons 168, 172 to effect energization of the motor 162. As the push buttons 168, 172 are closed and the motor 162 is energized, the operator will push forwardly on the handle levers 176, 180 causing the rollers 460, 470 to pivot downwardly against their immediately adjacent belts 302, 304 to effect a tightening thereof about the aligned pulleys 152, 298 and 154, 300, respectively. Assuming that all conditions are equal, the wheels 286, 288 will be rotated in the same direction as the pulleys 298, 300 and will drive the vehicle forwardly. Should the operator pull both levers 178, 180 in the reverse direction, the rollers 460, 470 will be raised from engagement with their associated belts 302, 304 and through belt slippage, no power will be transmitted to either of the pulleys 298, 300. Turning of the vehicle in one direction or the other is accomplished by applying more pressure to one of the rollers 460, 470 than to the other, all in the well-known manner. When the forward movement has been completed, the motor is de-energized by release of the push buttons 168, 172. Travel in a rearward direction is accomplished through the same mechanism, the same wheels, and the same electric controls, but in this instance, the reversing switch is set, of course, to energize the motor 162 to turn the gear 188 in the reverse direction.

Figure 6:
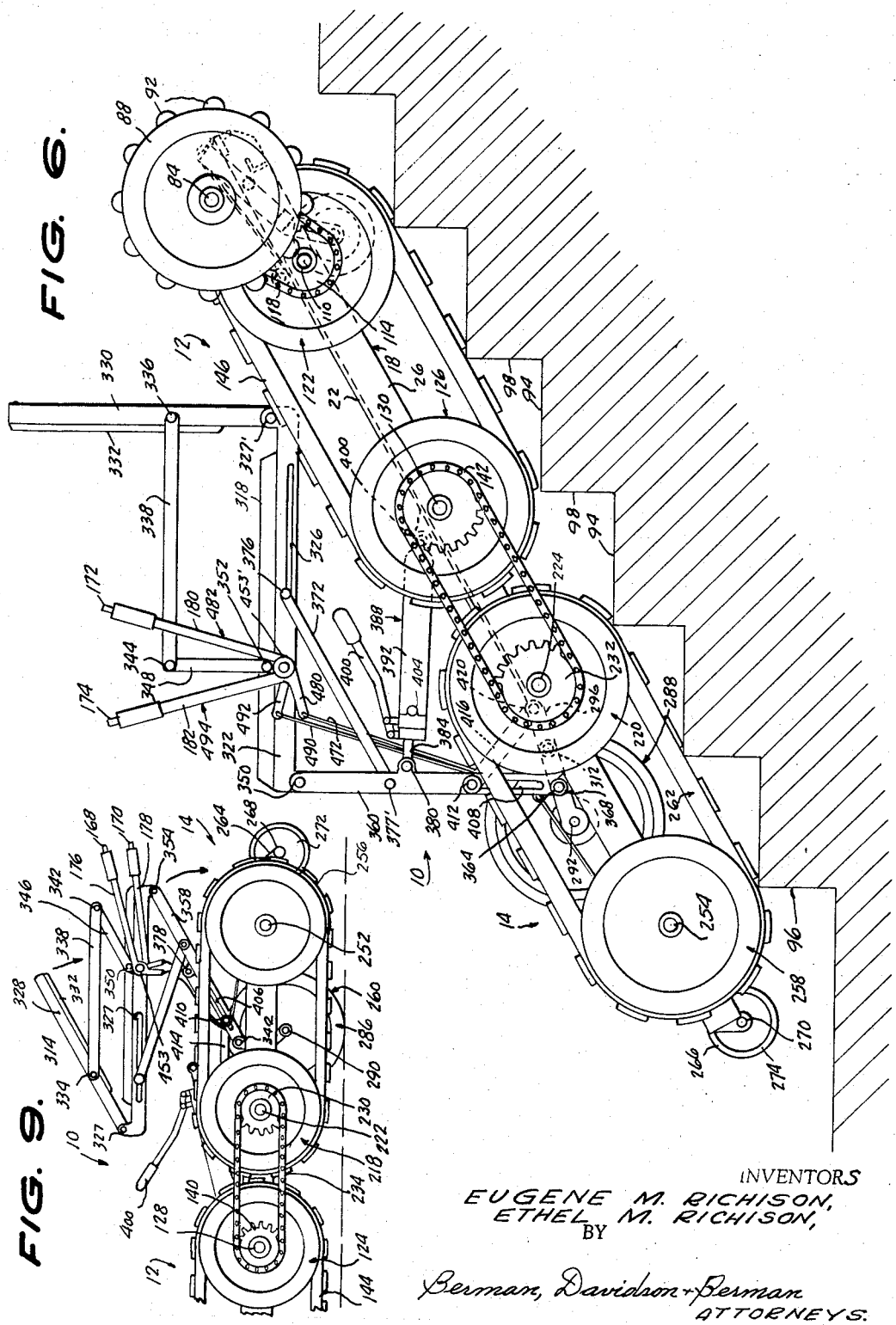
FIGURE 6 is a side elevational view of the wheelchair showing the same as it ascends or descends a stairway intermediate the ends thereof.

Assuming now that the occupant of the chair 314 desires to ascend a stairway such as shown at 96 in FIGURE 6, the operator will back the conveyance 10 into proximity with respect to the lowermost one of the risers 94 and will, at that point, halt the movement of the machine. The wheels 86, 88 should, preferably, overhang the lowermost one of the treads 98, and when this position has been achieved by the operator, the means 402, 404 will be operated, causing release of pressure in the hydraulic cylinders 386, 390 and retraction of the piston rods 382, 384 therein. The seat 314 including the braces 358, 360 will then pivot on the pins 362, 364 to move the platform 316 to an occupant-selected tilted position such as, for example, the position shown in FIGURE 7, this pivotal or turning movement being accomplished in a counterclockwise direction with reference to this last-named figure. As the braces 358 turn in this direction, the links 524, 426 are drawn to the left as viewed in FIGURE 5, thereby causing the pawls 506, 508 to pivot counterclockwise to release the nebs 516, 618 from beneath their respective feet 502. As the braces turn in the aforesaid direction, the levers 294, 296 are caused to turn in the same direction, thereby elevating the wheels 286, 288 to their raised positions and causing the traction belts 144, 146, 260 and 262 to engage the planar surface originally contacted by the wheels 286, 288. It should be here noted that as the platform 316 moves from its normal horizontal position as shown in FIGURE 5, to its inclined position shown in FIGURE 7, the cable 424 is released of its tension and the caster wheel 212 pivots in a counterclockwise direction, reference again being made to FIGURE 5, under the influence of the helicoidal spring 214. Thus, the conveyance 10 is completely supported on its endless traction belts.

The operator now grasps the outermost ones of the handle levers, namely, 176, 182 and depresses the buttons 168, 174 causing the motor 162 to again become energized, the reversing switch having been thrown to energize the motor 162, and to turn in the proper direction.

Under these conditions, and upon the pulling of the handle levers 176, 182 rearwardly, pressure is exerted on the belts 158, 160 which causes power to be transmitted to the pulleys 136, 138, and from these pulleys to the shafts 128, 130 to effect rotation of the wheels 124, 126 and the sprocket wheels 140, 142. The wheels 124, 126 drive the wheels 118, 120 through their respective endless traction belts 144, 146, and the power transmitted to wheels 120, 122 is conveyed through the shafts 108, 110 to the sprocket wheels 100, 102 by the sprocket chains 116, 118 and thence to the shafts 82, 84 to drive the lug wheels 86, 88, thereby causing the lugs 92 to engage the first of the treads 98 and to cause the rear end of the main unit 12 to rise and be drawn upwardly in the direction of the stair or curb corner until the endless traction belts 144, 146 engage thereon. Since the traction belts 144, 146 are also being driven, the main unit 12 will continue its upward and rearward movement as the lug wheels 86, 88 move upwardly out of engagement with the subsequent or following tread.

As the main unit 14 assumes its full position on the stairs, it gradually pivots in a counterclockwise direction, reference being made to FIGURE 7, until the traction belts 260, 262 engage the first corner of the stairway 90 (or curb) at which time it will be lifted rearwardly and upwardly thereon, the unit 12 pivoting on the shafts 222, 224. It must be remembered that as the sprocket wheels 140, 142 are driven, so, too, are the sprocket wheels 230, 232 which transmit power to the shafts 222, 224 thereby driving the wheels 208, 210 and the wheels 252, 254 through the belts 260, 262.

As the conveyance 10 reaches the top of the stairway 90 (or curb) the unit 12 will again gradually pivot about the shafts 222, 224 in a counterclockwise direction, reference again being made to FIGURE 7, until the main unit 12 again finds a planar surface to traverse. Continued operation of the conveyance 10 will draw the front or forward unit 14 upwardly and in the same direction until it also levels on the planar surface.

The occupant may now operate the levers 398, 400 to return the seat platform 316 to its normal horizontal position of FIGURE 5. This drives the links 524, 526 forwardly, re-engaging the nebs 516, 518 beneath the feet 500, 502 to lock the units 12, 14 together and, at the same time, causes the cable 424 to be drawn to the right as viewed in FIGURE 5. This rotates the sleeve 192 and its caster wheel 212 in a clockwise direction, reference still being made to FIGURE 5. As the platform 316 levels, the levers 294, 296 are pivoted in a clockwise direction, (reference still being made to FIGURE 5) to engage the wheels 286, 288 with the planar surface and to elevate the belts 144, 146 and 260, 260 out of engagement therewith.

The descent of the conveyance 10 is accomplished in substantially the same manner as described in connection with its ascent, and reference may be made to FIGURE 7 to illustrate the relationship between the component elements of the invention as the same approaches the end of the ascent or the beginning of the descent except, of course, that in descending, the direction of the drive of the motor 162 is reversed in order to cause the vehicle or conveyance 10 to move forwardly, and with the further exception to the effect that the lugged wheels 86, 88 make contact only with the final one of the treads 94 to lift the trailing end of the unit 14 gently off of the last stair of the stairway 96.

The steering of the vehicle while traction is being provided through the belts 144, 146 and 260, 262 is achieved in exactly the same manner as described above, except that in this instance, the operator will push or pull on the levers 176, 182 while maintaining the push buttons 168, 174 in their closed positions.

For compact storage of the conveyance 10, reference is made to FIGURE 9 of the drawings wherein the occupant's seat 314 is shown as collapsing in the direction of the arrows toward its inoperative position. To accomplish this collapsed condition, the hydraulic jacks 386, 388 are first disconnected from their respective pivotal connections 378, 380 with the braces 358, 360. The seat back 332 together with its back seat support members 328, 330 are pivoted about their pivotal connections 327, 327' thereby causing the arm rests 338, 340 to pivot about their respective pivotal connections 334, 336 and to cause the arm rests 338, 340 and the standards 346, 348 to pivot about their pivotal connections 342, 344 relative to one another, and the links or standards 346, 348 to also pivot forwardly about their pivotal connections 350, 352.

The slots 324, 326 may be of the bayonet type terminating at their forward ends in offset slots 327 (only one being shown) although the provision of these last-named slots is optional. Assuming, however, that these slots 327 are present, the pins 374, 376 are disengaged therefrom and the cushion or pad 318 is pushed downwardly causing the pins 374, 376 to move rearwardly in the slots 324, 326, respectively. Continued exertion of pressure on the pad 318 causes the flanges 320, 322 to move downwardly toward the braces 358, 360, and the latter pivot downwardly about their respective pivotal connections 362, 364. The levers 176, 178 pivot about their respective shafts 453, 453'. The over-all height of the conveyance 10 is, thus, materially reduced.

The conveyance 10 may be easily transported either in its operative position or in its collapsed condition by a single operator if it is desired to move the conveyance 10 while unoccupied from one site to another. This is simply accomplished by grasping the rear end frame member 34 and raising the same to cause the trundle wheels 272, 274 to engage against the ground or other supporting surface.

Having described and illustrated one embodiment of this invention in detail, it will be understood that the same is offered merely by way of example, and that this invention is to be limited only by the scope of the appended claims.

What is claimed is:

1. A power-driven conveyance comprising a pair of units each having a chassis including juxtaposed and remotely-disposed ends, endless traction belt means at a pair of opposed sides of said chassis supporting each said chassis in elevated position relative to a horizontal plane, means pivotally-connecting said juxtaposed chassis ends, releasable lock means holding said units against pivotal movement relative to one another, ground-engaging wheel means at one end of each of said units normally supporting, respectively, each of said units and their respective traction belts above said ground, means pivotally-connecting said ground-engaging wheel means with their respective units for retraction and expansion toward and away from their respective unit, selectively-operable means to effect said retraction and extension of said ground-engaging wheels whereby said endless traction belts may be moved into ground-engaging relation with the ground-engaging wheels retracted thereabove and vice versa, and selectively-operable power means connected in driving relation with said endless traction belts and said ground-engaging wheels.

2. A power-driven vehicle as defined in claim 1, and said endless traction belt means including a pair of pulley wheels for each of said belts, a shaft for each pulley wheel rotatably-supported on each of said units and said pulley wheels being fixedly-connected on one end of their respective shafts for rotation therewith, and flexible drive means connecting the pulley wheels on adjacent sides of said chassis at said juxtaposed ends thereof.

3. A power-driven vehicle as defined in claim 2, and lugged wheels rotatably-mounted on one of said units adjacent the outer end thereof, said lugged wheels being disposed, respectively, on the remotely-disposed sides of said one unit and overhanging said one end thereof.

4. A power-driven conveyance as defined in claim 3, wherein said ground-engaging wheels are pivotally-connected with one of said units.

5. A power-driven conveyance as defined in claim 4, and a cross-shaft journaled for rotation on said one unit, said power means being mounted on said one unit and connected in driving relation relative to said cross-shaft, and said selectively-operable power means includes flexible driving means connecting said cross-shaft with said ground-engaging wheels at one end of said one unit.

6. A power-driven conveyance as defined in claim 5, and operator seat means mounted on said one unit, means pivotally-connecting said ground-engaging wheel means on said one unit adjacent said one end thereof, a lever pivotally-mounted on said one unit adjacent the other end thereof, there being one lever for each of said ground-engaging wheels adjacent said other end of said one unit, a shaft for each lever journaled for rotation adjacent an end thereof, said ground-engaging wheels each being connected to one end of their respective shafts for rotation therewith, and flexible driving means connecting the other ends of said shafts with said cross-shaft.

7. A power-driven conveyance as defined in claim 6, and brace means having opposed ends, means pivotally-connecting one end of each brace means with said one unit, means connecting said seat with the other ends of said brace means, and means connected with said brace means and with said pivotal-connecting means at one end of said one unit for said ground-engaging wheel means at that end of said unit and with said levers to effect retraction of said ground-engaging wheels relative to said one unit, said last-named means being operable to effect extension of said ground-engaging wheels adjacent said other end of said one unit, and resilient means connected with said ground-engaging wheel means at said one end of said one unit to effect extension thereof.

8. A power-driven conveyance as defined in claim 7, and manually-operable means pivotally-connnected on said seat and selectively-operable to engage said power means with said drive means for said ground-engaging wheels and said endless traction belt means.

9. A conveyance comprising a pair of units each including a chassis having, respectively, two pairs of laterally-spaced and substantially parallel side frame members, said pairs of said side frame members having adjacent pairs of ends, means pivotally-connecting the proximate ends of said pairs of said side frame members at each side of said chassis, a first pair of pulley wheels for one end of said side frame members of one of said chassis, said pulley wheels being arranged in tandem groups of three at the remotely-disposed sides of one pair of said side frame members of said one chassis, a second pair of pulley wheels for the free ends of said side frame members of the other of said chassis, said last-named pulley wheels being disposed, respectively, on the remotely-disposed sides of said frame members of said other of said chassis and in tandem and aligned relation relative to said tandem groups of three pulley wheels, an endless traction belt trained about the pulley wheels adjacent said one end of said one chassis and the intermediate one of said tandem group of three pulley wheels at each side, respectively, of said one chassis, an endless traction belt trained about the pulley wheels of said tandem group adjacent the other end of said one chassis and the pulley wheels of said other of said chassis disposed at the free ends of its said side frame members, a ground-engaging wheel, means pivotally and caster mounting said ground-engaging wheel on said side frame members on said one chassis adjacent said one end of said one chassis, said ground-engaging wheel being pivotal about a horizontal axis to assume a vertically-adjusted position relative to said side frame members of said one chassis, a pair of ground-engaging wheels disposed adjacent the other end of said one chassis and proximate, respectively, to one of said side frame members of said one chassis, means pivotally-connecting each of said pair of ground-engaging wheels with its associated side frame member, said pair of ground-engaging wheels being adjustable for swinging movement about a horizontal axis, power means on said one chassis, and means selectively-connecting said power means with said endless traction belts and said pair of ground-engaging wheels, and a stair tread-engaging lugged wheel rotatably-supported on said one ends of said pair of side frame members of said one chassis in elevated overhanging relationship relative thereto, and means connecting said first pair of pulley wheels in driving relation with the adjacent ones of said lugged wheels, and a cross-shaft supported on said one chassis for rotation intermediate said first pair of said side frame members therefor, means connecting said power means with said cross-shaft, a pair of pulleys mounted on said cross-shaft adjacent each end thereof for rotation therewith, a shaft for each of said intermediate pulley wheels and for the pulley wheels adjacent said other end of said one chassis, said last-named shaft being journaled for rotation on, respectively, the immediately-adjacent one of said side frame members of said one chassis with their associated pulley wheels connected thereto for rotation therewith and at one end of their respective shafts, a sprocket wheel fixedly-secured on each one end of said last-named shafts with the sprocket wheels at each side of said one chassis being aligned with one another, an endless sprocket chain trained around each pair of aligned sprocket wheels, a pulley wheel connected to the others ends of said last-named sprockets and aligned with one pulley of each pair of pulleys on each end of said cross-shaft, an endless pulley belt loosely trained about each of said last-named pair of aligned pulleys, a bell-crank lever for each of said pulley belts, said bell-crank levers having an end supported on said cross-shaft for rotation relative thereto, a roller mounted on each second end of said bell-crank levers for pivotal engagement with said pulley belts, manually-operable means on said one chassis connected with each third end, respectively, of said bell-crank levers to effect pivotal engagement of said rollers with their respective belts, said means pivotally-connecting said pair of ground-engaging wheels on said side frame members of said one chassis including a lever for each ground-engaging wheel, a shaft journaled for rotation at one end of each of said levers and having, respectively, one of each of said ground-engaging wheels fixedly-secured to one end thereof for rotation therewith, a pulley fixedly-connected to the other end of each of said last-named shafts and aligned with, respectively, the other pulley of each pair of pulleys on said cross-shaft, an endless pulley belt loosely trained about said last-named aligned pulleys, a bell-crank lever for each of said last-named pulley belts, said bell-crank levers having an end thereof mounted on said cross-shaft for rotation relative thereto, a roller mounted on the second end of each of said bell-crank levers for engagement with said last-named pulley belts, and manually-operable means supported on said one chassis connected with said third end of each of said last-named bell-crank levers to effect engagement of said last-named rollers with said last-named pulley belts.

References Cited

UNITED STATES PATENTS

| 3,127,188 | 3/1964 | Greub | 280—5.22 |
| 3,166,138 | 1/1965 | Dunn | 180—9.24 |
| 3,276,531 | 10/1966 | Hale | 180—9.24 |
| 3,288,234 | 11/1966 | Feliz | 280—5.22 X |

FOREIGN PATENTS

| 225,873 | 1926 | Great Britain. |

RICHARD J. JOHNSON, *Primary Examiner.*

UNITED STATES PATENT OFFICE
CERTIFICATE OF CORRECTION

Patent No. 3,346,062          Dated   October 10, 1967

Inventor(s) Eugene M. Richison and Ethel M. Richison

It is certified that error appears in the above-identified patent and that said Letters Patent are hereby corrected as shown below:

Change Line 4 of Heading to Read:

-- ASSIGNORS OF 50% UNDIVIDED INTEREST TO T. H. CONKLIN, STIGLER, OKLAHOMA --

Signed and sealed this 5th day of February 1974.

(SEAL)
Attest:

EDWARD M. FLETCHER, JR.           RENE D. TEGTMEYER
Attesting Officer                 Acting Commissioner of Patents